United States Patent
Nitta et al.

(10) Patent No.: US 6,619,762 B2
(45) Date of Patent: Sep. 16, 2003

(54) HYDRAULIC BRAKE APPARATUS FOR A VEHICLE

(75) Inventors: Hirofumi Nitta, Ohbu (JP); Michiharu Nishii, Toyota (JP); Tadashi Terazawa, Toyota (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 31 days.

(21) Appl. No.: 09/941,836

(22) Filed: Aug. 30, 2001

(65) Prior Publication Data

US 2002/0030404 A1 Mar. 14, 2002

(30) Foreign Application Priority Data

Aug. 30, 2000 (JP) .................................... 2000-261929

(51) Int. Cl.⁷ .............................. B60T 8/88; B60T 13/58
(52) U.S. Cl. ............................ 303/122.12; 303/122.1; 303/11
(58) Field of Search ................... 303/122.12, 122.09, 303/122.1, 10, 11, 114.1, 115.1

(56) References Cited

U.S. PATENT DOCUMENTS

| | | | | |
|---|---|---|---|---|
| 4,869,558 A | * | 9/1989 | Yoshino | 303/122.12 |
| 4,895,416 A | * | 1/1990 | Tozu et al. | 303/116.1 |
| 5,000,520 A | | 3/1991 | Schmitt | |
| 5,413,404 A | * | 5/1995 | Inagawa | 303/122.12 |
| 5,695,260 A | * | 12/1997 | Tanaka et al. | 303/11 |
| 5,709,438 A | * | 1/1998 | Isakson et al. | 303/122.12 |
| 5,791,745 A | * | 8/1998 | Sakakibara | 303/11 |
| 5,934,880 A | * | 8/1999 | Yamada et al. | 303/10 |
| 6,109,879 A | * | 8/2000 | Yamada et al. | 303/10 |
| 6,132,012 A | * | 10/2000 | Ishii | 303/122.12 |
| 6,389,349 B1 | * | 5/2002 | Hachtel | 303/11 |

FOREIGN PATENT DOCUMENTS

JP        2-136365 A        5/1990

* cited by examiner

*Primary Examiner*—Jack Lavinder
*Assistant Examiner*—Robert A. Sicconolfi
(74) *Attorney, Agent, or Firm*—Burns, Doane, Swecker & Mathis, LLP (57) ABSTRACT

A hydraulic brake apparatus for a vehicle includes a supplementary hydraulic pressure source outputting a pressurized output hydraulic pressure and an electronic control apparatus that controls a hydraulic pump in the supplementary hydraulic pressure source. The electronic control apparatus judges whether the hydraulic pump satisfies a predetermined operating condition based on the output hydraulic pressure of the supplementary hydraulic pressure source or not. The electronic control apparatus compares the output hydraulic pressure with a minimum standard hydraulic pressure, detects a drop in the output hydraulic pressure when the output hydraulic pressure is less than a standard hydraulic pressure and determines that the hydraulic pump does not satisfy the predetermined operating condition.

18 Claims, 6 Drawing Sheets

HYDRAULIC BRAKE APPARATUS FOR A VEHICLE

This application is based on and claims priority under 35 U.S.C. §119 with respect to Japanese Patent Application 2000-261929, filed on Aug. 30, 2000, the entire content of which is incorporated herein by reference.

FIELD OF THE INVENTION

This invention generally relates to a hydraulic brake apparatus for a vehicle. More particularly, the present invention pertains to a hydraulic brake apparatus for the vehicle having an auxiliary hydraulic pressure source for generating a power hydraulic pressure to be used to apply brake pressure to a wheel cylinder associated with a wheel of the vehicle in response to operation of a brake operating member, and a warning mechanism for informing of a failure of an outputted hydraulic pressure generated by the auxiliary hydraulic pressure source.

BACKGROUND OF THE INVENTION

Various types of hydraulic brake apparatus for a vehicle are known. At least some known types of hydraulic brake apparatus include a master cylinder such as a hydraulic pressure generating apparatus for generating a brake pressure in response to operation of a brake operating member, and an auxiliary hydraulic pressure source for generating a power hydraulic pressure. The auxiliary hydraulic pressure source generally includes a hydraulic pump and an accumulator. These hydraulic brake apparatus typically require an adjustment of the power hydraulic pressure generated by the auxiliary hydraulic pressure source and an adequate warning in response to an excessive reduction of the power hydraulic pressure.

For example, U.S. Pat. No. 5,000,520 (corresponding to a Japanese Patent Application published on May 24, 1990 as Toku-Kai-Hei 2 (1990)-136365) discloses a hydraulic brake apparatus in which the power hydraulic pressure varies between 140–180 bar under operation of the auxiliary hydraulic pressure source. The pumping operation of a hydraulic pump is started in response to the reduction of the power hydraulic pressure below a predetermined lower limit and is continued until the power hydraulic pressure reaches an upper limit. A warning signal is generated in response to the reduction of the power hydraulic pressure below a predetermined lowest limit set at 105 bar.

In the apparatus disclosed in the above-mentioned U.S. patent, to operate the hydraulic pump and generate the warning signal when a relay contact fails, an electric circuit arrangement is provided that includes a pressure responsive switch and a relay arrangement for controlling operation of an electric driving motor connected to the hydraulic pump to maintain the power hydraulic pressure within a predetermined range (e.g. 140–180 bar), another pressure responsive switch for generating the warning signal in response to the reduction of the power hydraulic pressure below the predetermined lower limit, and another relay for controlling the operation of the electric driving motor.

In the apparatus described in the above-mentioned U.S. patent, if the hydraulic pump is normally operable, it is able to maintain a driving condition of the hydraulic pump in response to a reduction of the power hydraulic pressure. However, if the capacity of the accumulator is small, the warning signal may be frequently generated during normal operation of the hydraulic pump. Further, the electric circuit arrangement including the two pressure responsive switches and the two relays increases the manufacturing cost associated with the apparatus.

A need thus exists for a hydraulic brake apparatus having an auxiliary hydraulic pressure source for generating a power hydraulic pressure in which, if the hydraulic pump is normally operating, the operation of the hydraulic pump is controlled in response to varying the power hydraulic pressure to generate the power hydraulic pressure without generating frequent warning signals.

SUMMARY OF THE INVENTION

According to one aspect of the present invention, a hydraulic brake apparatus for a vehicle includes a reservoir containing brake fluid, a wheel cylinder associated with a road wheel of the vehicle, and an auxiliary hydraulic pressure source for generating a power hydraulic pressure that is used to apply brake pressure to the wheel cylinder in response to a braking requirement. The auxiliary hydraulic pressure source includes a hydraulic pump for increasing the pressure of the brake fluid supplied from the reservoir to generate the power hydraulic pressure. A power hydraulic pressure observing device observes continuously the power hydraulic pressure and generates a signal for controlling operation of the hydraulic pump based on the power hydraulic pressure. A pump operating condition judging mechanism judges whether or not the operating condition of the hydraulic pump satisfies a predetermined operating condition based on the power hydraulic pressure observed by the power hydraulic pressure observing means. A warning mechanism compares the power hydraulic pressure observed by the power hydraulic observing device with a predetermined hydraulic pressure and generates a warning signal indicating a failure of the power hydraulic pressure when the power hydraulic pressure is less than the predetermined hydraulic pressure and the pump operating condition judging mechanism judges that the operating condition of the hydraulic pump does not satisfy with the predetermined operating condition.

The pump operating condition judging mechanism detects a rising tendency of the power hydraulic pressure observed by the power hydraulic pressure observing device, and the pump operating condition judging mechanism judges that the operating condition of the hydraulic pump satisfies the predetermined operating condition when the power hydraulic pressure observed by the power hydraulic pressure observing device shows the rising tendency while the power hydraulic pressure observed by the power hydraulic pressure observing device is less than the predetermined hydraulic pressure.

The pump operating condition judging mechanism detects a rising tendency of the power hydraulic pressure observed by the power hydraulic pressure observing device and detects the starting of driving of the hydraulic pump, and the pump operating condition judging means judges that the operating condition of the hydraulic pump satisfies the predetermined operating condition when the power hydraulic pressure observed by the power hydraulic pressure observing device shows the rising tendency from a zero pressure within a predetermined time period after the driving of the hydraulic pump is started.

The pump operating condition judging mechanism detects a rising tendency of the power hydraulic pressure observed by the power hydraulic pressure observing device, and the pump operating condition judging mechanism judges that the operating condition of the hydraulic pump satisfies the predetermined operating condition when the power hydraulic pressure observed by the power hydraulic pressure observing device shows the rising tendency within the predetermined time period after the power hydraulic pressure observed by the power hydraulic pressure observing device falls below the predetermined hydraulic pressure.

The pump operating condition judging mechanism calculates a changing rate of the power hydraulic pressure observed by the power hydraulic pressure observing device and detects a starting of a driving of the hydraulic pump, and the pump operating condition judging mechanism judges that the operating condition of the hydraulic pump satisfies the predetermined operating condition when the changing rate of the power hydraulic pressure observed by the power hydraulic pressure observing device becomes a positive rate within a predetermined time period after the driving of the hydraulic pump is started.

The pump operating condition judging mechanism calculates a changing rate of the power hydraulic pressure observed by the power hydraulic pressure observing device, and the pump operating condition judging mechanism judges that the operating condition of the hydraulic pump satisfies the predetermined operating condition when the changing rate of the power hydraulic pressure observed by the power hydraulic pressure observing device changes from a negative rate to a positive rate within a predetermined time period after the power hydraulic pressure observed by the power hydraulic pressure observing device falls below the predetermined hydraulic pressure.

The hydraulic brake apparatus also includes a hydraulic pressure generating apparatus for generating the brake pressure in response to operation of a brake operating member. The hydraulic pressure generating apparatus includes a master cylinder and a hydraulic brake booster operable by the power hydraulic pressure to assist in operation of the master cylinder. A master cylinder hydraulic pressure sensor is provided to continuously detect the master cylinder hydraulic pressure generated by the master cylinder. A consumed hydraulic pressure estimating mechanism is provided for estimating a consumed hydraulic pressure at the auxiliary hydraulic pressure source based on the master cylinder pressure detected by the master cylinder hydraulic pressure sensor. The pump operating condition judging mechanism calculates a changing rate of the power hydraulic pressure observed by the power hydraulic pressure observing device and calculates a changing rate of the consumed hydraulic pressure estimated by the consumed hydraulic pressure estimating mechanism. The pump operating condition judging mechanism judges that the operating condition of the hydraulic pump satisfies the predetermined operating condition when a sum of the changing rate of the consumed hydraulic pressure estimated by the consumed hydraulic pressure estimating mechanism and a predetermined lowest changing rate of the outputting hydraulic pressure of the hydraulic pump is less than the changing rate of the power hydraulic pressure observed by the power hydraulic pressure observing device.

The hydraulic brake apparatus further includes a wheel cylinder hydraulic pressure sensor for detecting continuously the hydraulic brake pressure supplied to the wheel cylinder, a consumed hydraulic pressure estimating mechanism for estimating a consumed hydraulic pressure at the auxiliary hydraulic pressure source based on the wheel cylinder hydraulic detected by the wheel cylinder hydraulic pressure sensor. The pump operating condition judging mechanism calculates a changing rate of the power hydraulic pressure observed by the power hydraulic pressure observing device and calculates a changing rate of the consumed hydraulic pressure estimated by the consumed hydraulic pressure estimating mechanism. The pump operating condition judging mechanism judges that the operating condition of the hydraulic pump satisfies the predetermined operating condition when a sum of the changing rate of the consumed hydraulic pressure estimated by the consumed hydraulic pressure estimating mechanism and a predetermined lowest changing rate of the outputting hydraulic pressure of the hydraulic pump is less than the changing rate of the power hydraulic pressure observed by the power hydraulic pressure observing device.

According to another aspect of the present invention, a hydraulic brake apparatus for a vehicle includes a reservoir containing brake fluid, a wheel cylinder associated with a road wheel of the vehicle, and an auxiliary hydraulic pressure source for generating a power hydraulic pressure used to apply a brake pressure to the wheel cylinder in response to a braking requirement. The auxiliary hydraulic pressure source includes a hydraulic pump for increasing a pressure of the brake fluid supplied from the reservoir to generate the power hydraulic pressure. A power hydraulic pressure monitoring mechanism detects continuously the power hydraulic pressure and generates a signal for controlling operation of the hydraulic pump based on a detected power hydraulic pressure. A mechanism detects a changing rate of the power hydraulic pressure detected by the power hydraulic pressure monitoring mechanism, and generates a warning signal indicating a failure of the power hydraulic pressure on the basis of the detected power hydraulic pressure and the changing rate of the detected power hydraulic pressure.

According to another aspect of the invention, a method of operating a vehicle hydraulic brake apparatus involves continuously determining a power hydraulic pressure generated by an auxiliary hydraulic pressure source, wherein the auxiliary hydraulic pressure source includes a hydraulic pump which increases a pressure of brake fluid supplied from a reservoir to generate the power hydraulic pressure that is used to apply brake pressure to a vehicle wheel cylinder. A signal is generated to control operation of the hydraulic pump based on the power hydraulic pressure, and the power hydraulic pressure generated by the auxiliary hydraulic pressure source is compared with a predetermined hydraulic pressure of the auxiliary hydraulic pressure source. A determination is made regarding whether or not an operating condition of the hydraulic pump satisfies a predetermined operating condition based on the detected power hydraulic pressure, and a warning is issued indicating failure of the power hydraulic pressure when the detected power hydraulic pressure is less than the predetermined hydraulic pressure and when it is determined that the operating condition of the hydraulic pump does not satisfy the predetermined operating condition.

BRIEF DESCRIPTION OF THE DRAWING FIGURES

The foregoing and additional features and characteristics of the hydraulic brake apparatus for a vehicle according to the present invention will become more apparent from the following detailed description considered in conjunction with the accompanying drawing figures in which like elements bear like reference numerals and wherein.

DETAILED DESCRIPTION OF THE INVENTION

Figure 1:
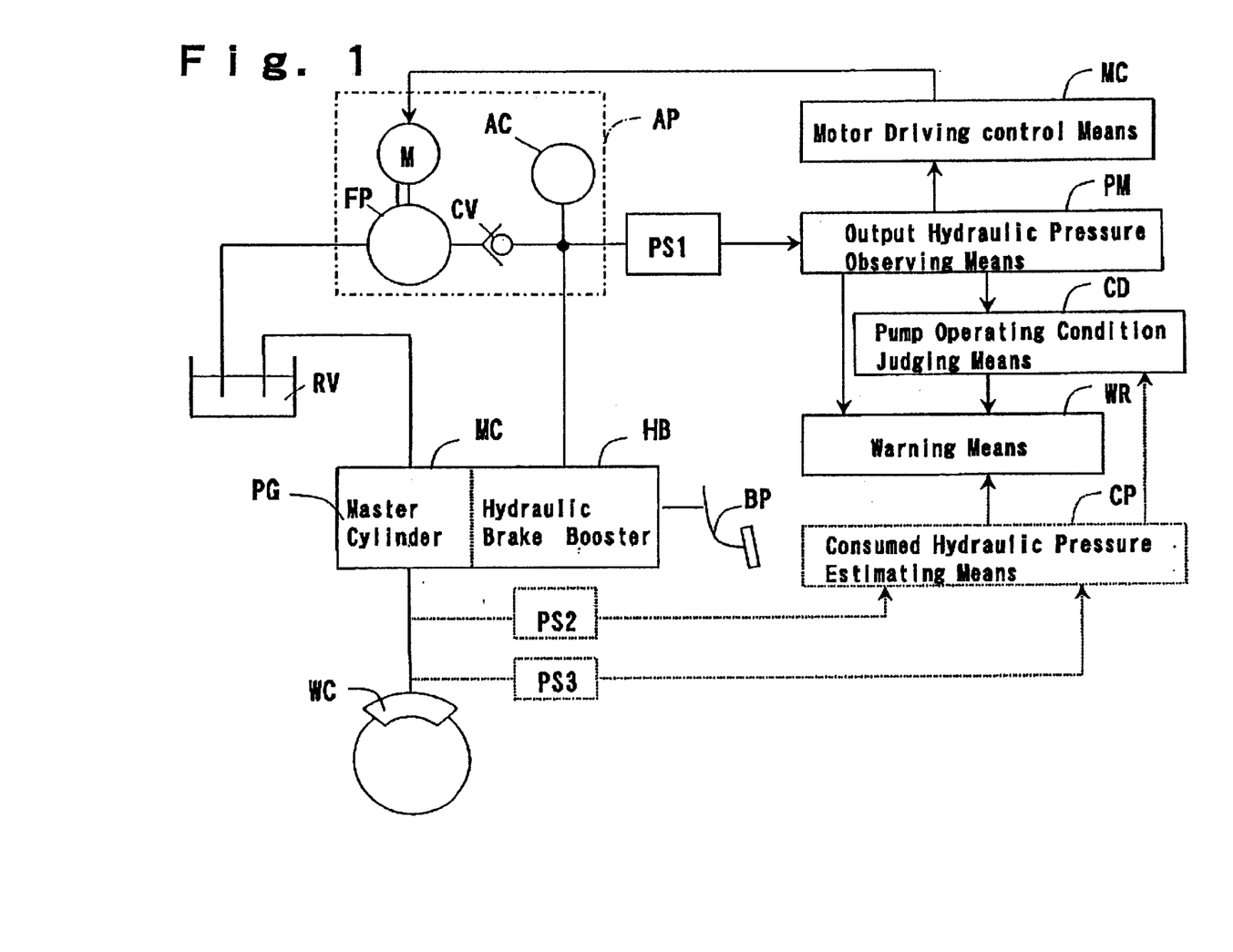
FIG. 1 is a schematic block diagram of a hydraulic brake apparatus according to a first embodiment of a present invention.

Referring initially to FIG. 1 which schematically illustrates the construction of a hydraulic brake apparatus according to an embodiment of the present invention, the vehicle hydraulic brake apparatus includes a hydraulic pressure generating apparatus PG that increases the pressure of brake fluid supplied from a brake fluid containing reservoir RV in response to operation of a brake operating member such as a brake pedal BP and supplies brake pressure to a wheel cylinder WC. The vehicle hydraulic brake apparatus also includes an auxiliary hydraulic pressure source AP for generating a power hydraulic pressure.

The auxiliary hydraulic pressure source AP includes a hydraulic pump FP driven by an electric motor M. The hydraulic pump FP has an inlet hydraulically connected to a brake fluid containing reservoir and an outlet hydraulically connected to an accumulator AC through a check valve CV.

Figure 2:
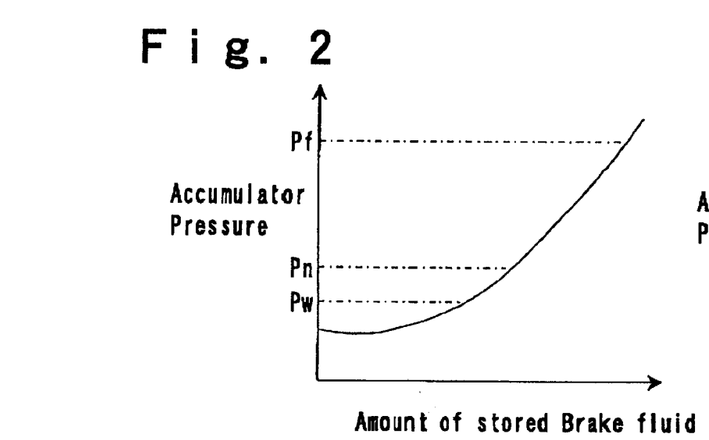
FIG. 2 is a graph showing characteristics of a hydraulic pump based on accumulator pressure according to the first embodiment of the present invention.

A hydraulic pressure sensor PS1 is connected to the accumulator AC. The accumulator pressure of the power hydraulic pressure generated by the auxiliary hydraulic pressure source AP is continuously detected by the hydraulic pressure sensor PS1, and is observed or monitored by a power hydraulic pressure observing or monitoring means PM based on the output from the hydraulic pressure sensor PS1. The motor M for driving the hydraulic pump FP is controlled by a motor driving control means MC based on the hydraulic pressure detected by the hydraulic pressure sensor PS1 as observed by the power hydraulic pressure observing means PM. More specifically, as shown in FIG. 2, when the accumulator pressure decreases below a lower level Pn (a predetermined lower limit), the driving of the electric motor M is started. When the accumulator pressure increases to an upper level (a predetermined upper limit) Pf, the driving of the electric motor M is stopped.

A pump operating condition judging means CD judges whether or not the operation of the hydraulic pump FP satisfies a predetermined operating condition at least on the basis of the accumulator pressure or the power hydraulic pressure of the auxiliary hydraulic pressure source AP observed by the power hydraulic pressure observing means PM. The bold solid line in FIG. 2 shows the relationship between the accumulator pressure and the amount of stored brake fluid in the accumulator AC under operation of the auxiliary hydraulic pressure source.

The pump operating condition judging means CD is constructed such that the pump operating condition judging means CD judges or determines that the operation of the hydraulic pump FP satisfies the predetermined operating condition when the accumulator pressure (i.e., the power hydraulic pressure) generated by the auxiliary hydraulic pressure source AP and observed by the power hydraulic pressure observing means PM shows a rising tendency while the accumulator pressure observed by the power hydraulic pressure observing means PM is less than a predetermined lowest hydraulic pressure Pw (predetermined hydraulic pressure).

Figure 7:
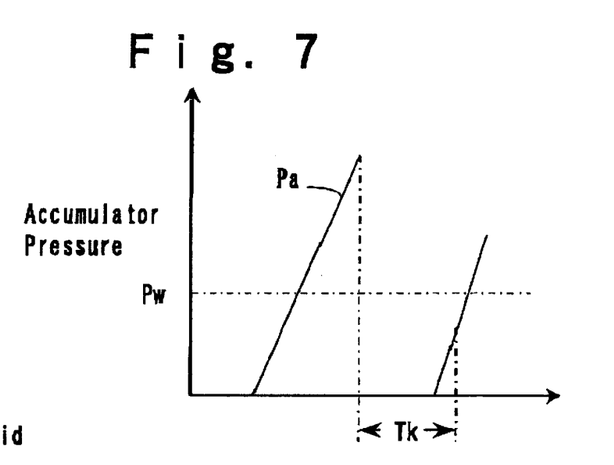
FIG. 7 is a graph showing a first characteristic of the accumulator pressure according to the first embodiment of the present invention.

Alternatively, as shown in FIG. 7, the pump operating condition judging means CD may be constructed such that the pump operating condition judging means CD judges or determines that the operation of the hydraulic pump FP satisfies the predetermined operating condition when the accumulator pressure pressure (i.e., the power hydraulic pressure) generated by the auxiliary hydraulic pressure source AP and observed by the power hydraulic pressure observing means PM shows a rising tendency from a zero pressure within a predetermined time period after the driving of the hydraulic pump FP is started.

Figure 8:
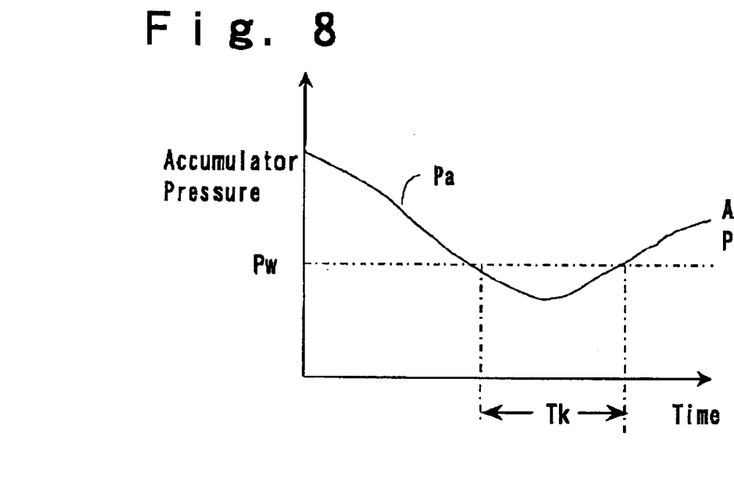
FIG. 8 is a graph showing a second characteristic of the accumulator pressure according to the first embodiment of the present invention.

As a further alternative shown in FIG. 8, the pump operating condition judging means CD may be constructed such that the pump operating condition judging means CD judges or determines that the operating condition of the hydraulic pump FP satisfies the predetermined operating condition when the accumulator pressure pressure (i.e., the power hydraulic pressure) generated by the auxiliary hydraulic pressure source AP and observed by the power hydraulic pressure observing means PM shows a rising tendency within a predetermined time period after the accumulator pressure observed by the power hydraulic pressure observing means PM falls below the predetermined lowest hydraulic pressure Pw (predetermined hydraulic pressure).

A warning means WR compares the accumulator pressure (i.e., the power hydraulic pressure) generated by the auxiliary hydraulic pressure source AP and observed by the power hydraulic pressure observing means PM with the predetermined lowest hydraulic pressure Pw. Only when the accumulator pressure is less than the predetermined lowest hydraulic pressure Pw and the pump operating condition judging means CD judges or determines that the operating condition of the hydraulic pump FP does not satisfy the predetermined operating condition, the warning means WR generates a warning signal informing or advising of a failure of the accumulator pressure generated by the auxiliary hydraulic pressure source AP. The warning means WR can take a variety of forms, including a warning lamp or a warning buzzer, and is operable in response to the warning signal as an informing device which informs the driver of the vehicle of the failure of the accumulator pressure. Also, it is to be understood that the warning signal generated by the warning means WR may be supplied to another brake control apparatus such as an anti-skid control apparatus.

The above-mentioned hydraulic pressure generating apparatus PG may be comprised of a master cylinder MC and a hydraulic brake booster operable by the power hydraulic pressure generated by the auxiliary hydraulic pressure source AP to assist operation of the master cylinder MC. As shown in phantom lines in FIG. 1, several additional features can be incorporated into the hydraulic brake apparatus. That is, the hydraulic brake apparatus can be provided with a master cylinder hydraulic pressure sensor PS2 for detecting the output hydraulic pressure of the master cylinder MC continuously, and a consumed hydraulic pressure estimating means CP for estimating the consumed hydraulic pressure of the auxiliary hydraulic pressure source AP based on the pressure detected by the master cylinder hydraulic pressure sensor PS2. The pump operating condition judging means CD calculates the changing rate of the accumulator pressure observed by the power hydraulic pressure observing means PM and detects the starting of the driving of the hydraulic pump FP. The consumed hydraulic pressure estimating means CP calculates a changing rate of the consumed hydraulic pressure at the auxiliary hydraulic pressure source AP estimated by the consumed hydraulic pressure estimating means CP. The pump operating condition judging means CD judges that the operating condition of the hydraulic pump FP satisfies the predetermined condition when the sum of the changing rate of the consumed hydraulic pressure of the auxiliary hydraulic pressure source AP estimated by the consumed hydraulic pressure estimating means CP and a predetermined lowest changing rate of the outputted hydraulic pressure of the hydraulic pump FP is less than a changing rate of the accumulator pressure observed by the power hydraulic pressure observing means PM. This point is explained below further with reference to FIGS. 6 and 9.

As also shown in FIG. 1, the hydraulic brake apparatus can also be provided with a wheel cylinder hydraulic pressure sensor PS3 for continuously detecting the hydraulic pressure of the wheel cylinder WC. The consumed hydraulic pressure estimating means CP estimates the consumed hydraulic pressure at the supplementary hydraulic pressure source AP based on the wheel cylinder hydraulic pressure detected by the hydraulic pressure sensor PS3. The pump operating condition judging means CD performs a judgment similar to the above-mentioned condition.

Figure 3:
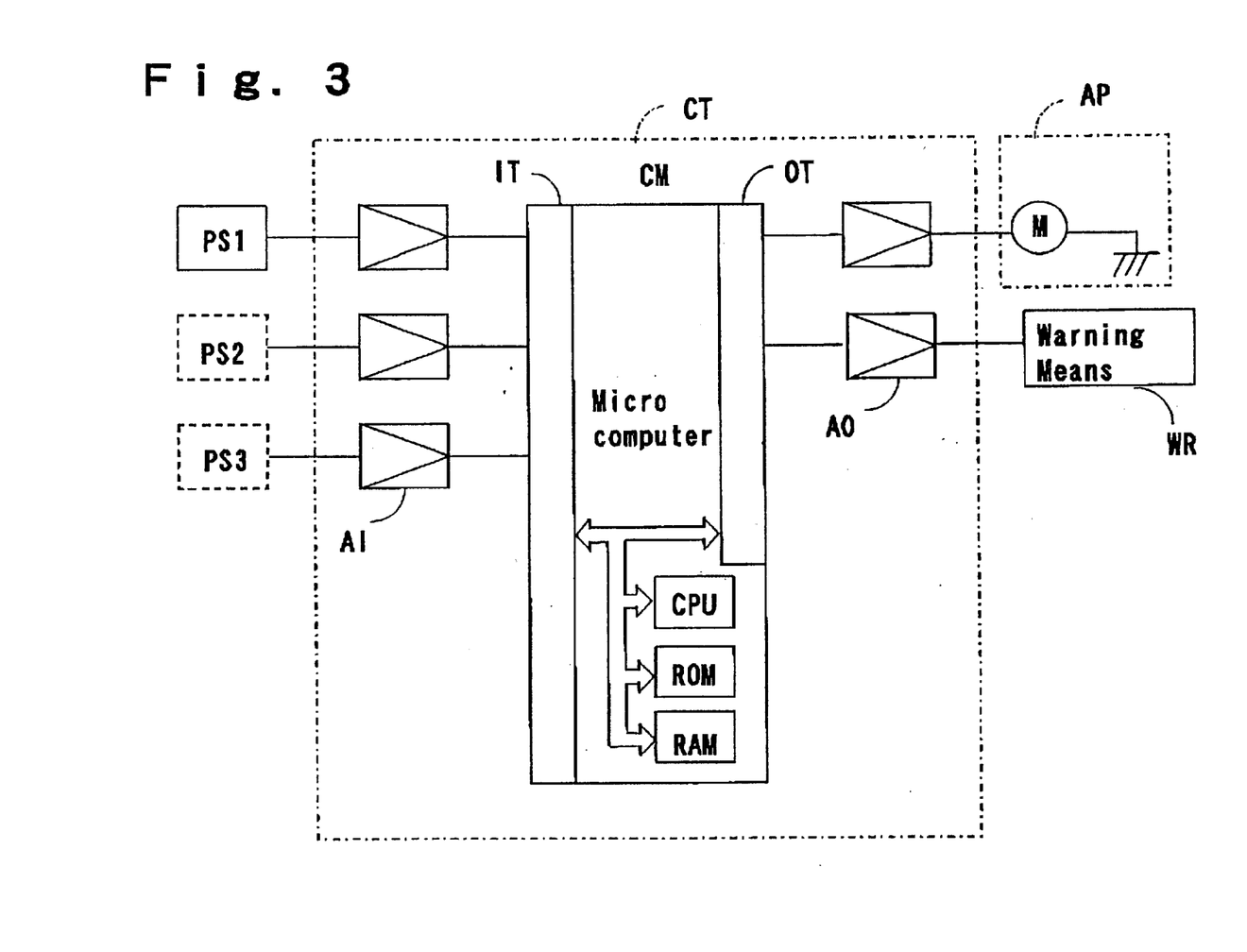
FIG. 3 is a block diagrams showing a construction of an electronic control apparatus according to the first embodiment of the present invention.

As shown in FIG. 3, an electronic control apparatus CT includes a microcomputer CM which can perform the function of, for example, the above-mentioned output hydraulic pressure observing means PM. The hydraulic pressure sensor PS1, the master cylinder hydraulic pressure sensor PS2, and the wheel cylinder hydraulic pressure sensor PS3 are connected to the electronic control apparatus CT so that the electronic control apparatus CT receives input from these sensors. The electronic control apparatus CT controls the operation of the electric motor M and the informing device in the warning means WR.

In FIG. 3. the electronic control apparatus CT includes the microcomputer CM including a CPU, a ROM, a RAM, an input interface IT, and an output interface OT which are connected via a bus. Output signals from the hydraulic pressure sensors PS1, PS2, PS3 are transmitted from the input interface IT to the CPU via amplifier circuits AI. Further, control signals outputted from the microcomputer CM through the output interface OT are transmitted to to the electric motor M and the informing device in the warning means WR via driving circuits AO. In the microcomputer CM, the ROM stores a program corresponding to the flowchart shown in FIG. 4, the CPU executes the program while an ignition switch of the vehicle is in the ON condition, and the RAM temporarily stores needed variable data when the program is executed.

In the hydraulic brake apparatus having the above-mentioned construction, the electronic control apparatus CT executes a series of processes or steps to effect driving control of the hydraulic pump FP and warning indication by the warning means WR. When the ignition switch is in the closed condition (i.e., when the ignition is started), the stored program in the ROM is started by the microcomputer CM. The warning process of the warning means WR based on the flowchart in FIG. 4 is executed as explained below.

Figure 4:
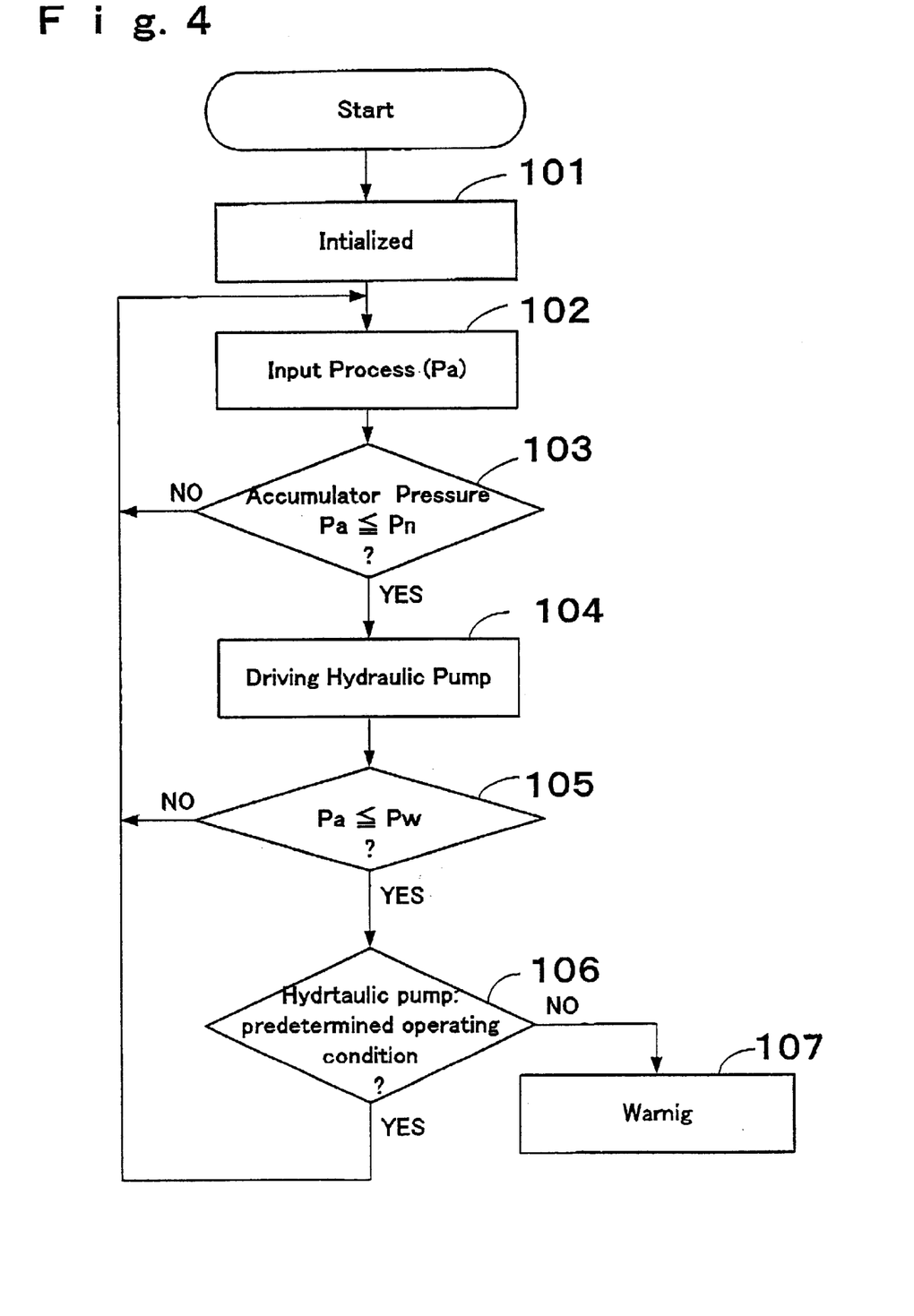
FIG. 4 is a flowchart of a main routine including the driving of the hydraulic pump and the warning process performed by the CPU according to the first embodiment of the present invention.

Referring to the program or routine shown in FIG. 4, at step 101 the microcomputer CM performs an initialization in which various calculated values are cleared. Next, the program proceeds to step 102 in which the output signal of the hydraulic pressure sensor PS1 (i.e., the accumulator pressure Pa which is the output hydraulic pressure of the auxiliary hydraulic pressure source AP) is read by the CPU. At step 103, the accumulator pressure Pa is compared to the lower level pressure Pn which is a standard or set value indicating when the driving of the hydraulic pump FP is started. When the accumulator pressure Pa is less than the lower level pressure Pn, the program proceeds to step 104 at which the hydraulic pump FP is driven by the motor M. Next, the program proceeds to step 105 where the accumulator pressure Pa is compared to the lowest hydraulic pressure or predetermined hydraulic pressure Pw (Pw<Pn). When the CPU determines at step 105 that the accumulator pressure Pa is less than the lowest hydraulic pressure Pw, the program proceeds to step 106. Here the CPU judges whether or not the operating condition of the hydraulic pump FP satisfies the predetermined operating condition. When it is determined in step 106 that the operating condition of the hydraulic pump FP satisfies the predetermined operating condition, the program returns to step 102. When the operating condition of the hydraulic pump FP does not satisfy the predetermined operating condition in step 106, the program advances to step 107 and a warning is emitted by the warning means WR.

Figure 5:
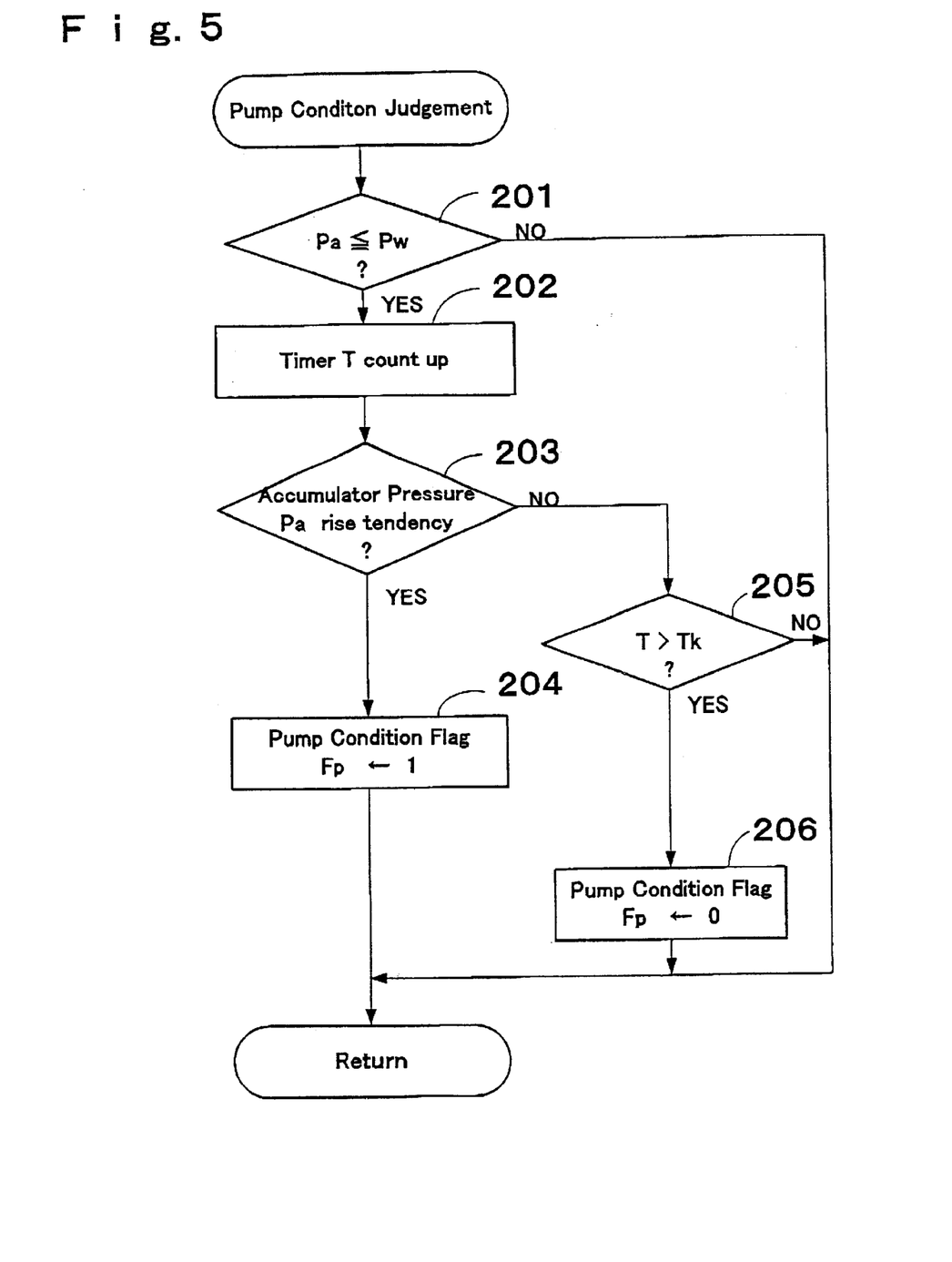
FIG. 5 is a flowchart of a pump operating condition judgment according to the first embodiment of the present invention.

The determination in step 106 of FIG. 4 regarding whether or not the operating condition of the hydraulic pump FP satisfies the predetermined operating condition is carried out according to the flowchart shown in FIG. 5. Initially in step 201 of FIG. 5, the CPU judges whether or not the accumulator pressure Pa is less than the lowest hydraulic pressure Pw. For example, as shown in FIG. 7, as the accumulator pressure Pa falls to a zero pressure when the vehicle is placed in a condition of long time parking so that the accumulator pressure Pa is lost, the accumulator pressure Pa is necessarily less than the lowest hydraulic pressure Pw. Under a condition such as when the accumulator pressure Pa is zero, the program proceeds to step 202 when the driving of the hydraulic pump FP is started after the ignition switch is closed (i.e., when the ignition is turned on). Here, a counter for a timer T starts at step 202. Then, the CPU judges at step 203 whether or not a change in the accumulator pressure exhibits a rising tendency from the zero condition within a predetermined time Tk. In this embodiment, the CPU judges at step 203 whether or not a differential value (dPa/dt) of the accumulator pressure Pa is greater than zero. When the differential value (i.e., the changing rate) dPa/dt is greater than zero, the CPU judges that the operation of the hydraulic pump FP is normal and the operating condition of the hydraulic pump FP satisfies the predetermined operating condition. Then, the program proceeds to step 204 at which a pump condition flag Fp is set to 1.

On the other hand, when the differential value dPa/dt of the accumulator pressure Pa is less than zero and the accumulator pressure Pa does not exhibit a rising tendency at step 203, the program proceeds to step 205 where the CPU judges whether or not the count value of the timer T has passed a predetermined time Tk. When the CPU judges at step 205 that the count value of the timer T is equal to or less than the predetermined time Tk, the program returns to the main routine shown in FIG. 4. However, when the CPU judges at step 205 that the count value of the timer T is greater than the predetermined time Tk, the CPU determines that it is not satisfied with the operating condition of the hydraulic pump FP because the accumulator pressure Pa does not show a rise tendency within the predetermined time Tk. Therefore, the program proceeds to step 206 where the pump condition flag Fp is cleared to zero.

On the other hand, when for example the accumulator pressure Pa is excessively consumed by normal braking and/or automatic braking (e.g., steering control by braking, traction control, etc.) so that the accumulator pressure Pa falls below the lowest hydraulic pressure Pw, the program proceeds from step 201 to step 202 in FIG. 5, and the timer T is counted up at step 202. Next, the CPU judges whether or not the accumulator pressure Pa shows a rising tendency within the predetermined time Tk. That is, the CPU judges at step 203 whether the differential value dPa/dt of the accumulator pressure Pa changes from a negative value to a positive value. When the accumulator pressure Pa exhibits the rising tendency as shown in FIG. 8, the differential value dPa/dt changes to a positive value and so the CPU judges that the operating condition of the hydraulic pump FP satisfies the predetermined condition. The program then proceeds to step 204 where the pump condition flag Fp is set to 1. When the accumulator pressure Pa does not exhibit the rising tendency at step 203, the program proceeds to step 205.

At step 205, the CPU judges whether or not the count value of the timer T is within the predetermined time Tk. When the CPU judges that the count value of the timer T has passed or exceeded the predetermined time Tk at step 205, the program proceeds to step 206. Here, the pump condition flag Fp is cleared (i.e., set to zero).

Figure 6:
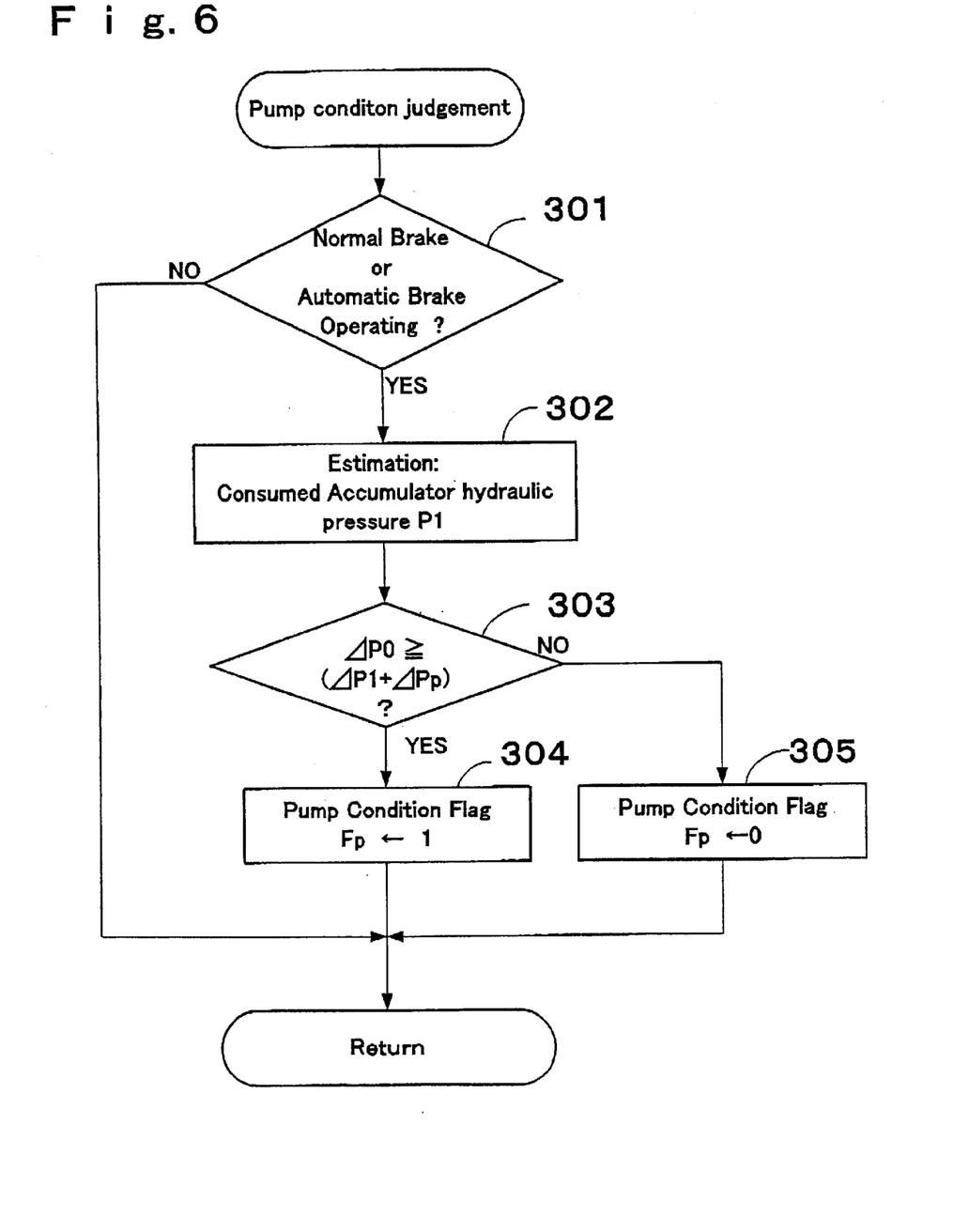
FIG. 6 is a flowchart of a pump operating condition judgment according to a second embodiment of the present invention.

FIG. 6 shows an alternative routine for judging whether or not the operating condition of the hydraulic pump FP satisfies the predetermined operating condition at step 106 in FIG. 4. In step 301, the CPU initially judges whether or not the normal braking operation or the automatic braking operation (e.g., steering control by braking, traction control, etc.) is occurring, namely whether the accumulator pressure is being consumed. If it is determined in step 301 that normal braking or automatic braking is operating, the program proceeds to step 302. At step 302, the consumed hydraulic pressure P1 at the accumulator AC is estimated based on the master cylinder hydraulic pressure detected by the master cylinder hydraulic pressure sensor PS2 at step 302. That is, the amount of consumed hydraulic fluid at a hydraulic pressure circuit including all wheel cylinders is estimated based on the master cylinder pressure, and then the amount of consumed hydraulic fluid at the accumulator AC is estimated based on the amount of consumed hydraulic fluid of the hydraulic pressure circuit. The consumed hydraulic pressure at the auxiliary hydraulic pressure source AP (i.e., the consumed hydraulic pressure P1 of the accumulator AC) is estimated according to the graph shown in FIG. 2.

Figure 9:
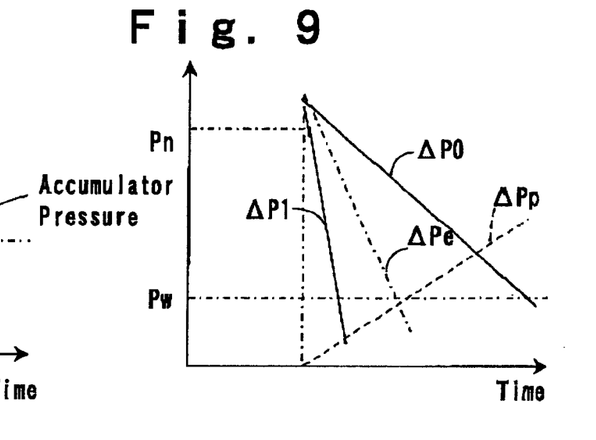
FIG. 9 is a graph showing a third characteristic of the accumulator pressure according to the second embodiment of the present invention.

The program then proceeds to step 303 at which the gradient of the consumed hydraulic pressure P1 at the accumulator AC (i.e., the changing rate of the consumed hydraulic pressure at the accumulator AC) is calculated by the CPU. The sum of the changing rate ΔP1 of the consumed hydraulic pressure at the accumulator AC and a predetermined lowest changing rate ΔPp of the outputting hydraulic pressure of the hydraulic pump FP (corresponding to ΔPe in FIG. 9) is compared to a changing rate ΔP0 of the power hydraulic pressure (accumulator pressure Pa) of the auxiliary hydraulic pressure source AP observed by the power hydraulic pressure observing means PM. FIG. 9 shows the relationship between ΔP0, ΔP1, ΔPp, ΔPe and the accumulator pressure Pa. Further, the lowest changing rate ΔPp of the outputting hydraulic pressure of the hydraulic pump FP means a changing rate of the outputting hydraulic pressure of the pump FP (a constant value) when the environment condition is set to the worst condition for the output of the hydraulic pump FP, e.g., when the voltage of the motor M is a lower value and the circumference temperature is a lower value.

Further, at step 303, the CPU judges or determines that the operating condition of the hydraulic pump FP satisfies the predetermined operating condition when the CPU determines that the changing rate ΔP0 of the accumulator pressure Pa is equal to or greater than the sum of the changing rate ΔP1 of the consumed hydraulic pressure at the accumulator AC and the predetermined lowest changing rate ΔPp of the outputting hydraulic pressure of the hydraulic pump FP (ΔP0≧ΔP1+ΔPp). In other words, when the above-mentioned sum (ΔP1+ΔPp) is less than the changing rate ΔP0 of the accumulator pressure Pa, the program proceeds to step 304 where the pump condition flag Fp is set to 1. To the contrary, when the changing rate ΔP0 of the accumulator pressure Pa is less than the above-mentioned sum (ΔP1+ΔPp), in other words the above-mentioned sum (ΔP1+ΔPp) is greater than the changing rate ΔP0 of the accumulator pressure Pa, the program proceeds to step 305 where the pump condition flag is cleared or set to zero.

It is to be understood that the consumed hydraulic pressure P1 of the accumulator AC can also be estimated based on the wheel cylinder pressure detected by the hydraulic pressure sensor PS3 of the wheel cylinder WC shown in FIG. 1. Further, the CPU can be adapted to determine or judge the pump operating condition by another method such as the above-mentioned determining method based on the consumed hydraulic pressure P1 at the accumulator AC. It is thus possible to prevent an unnecessary warning when the automatic brake control is operating.

What is claimed is:

1. A hydraulic brake apparatus for a vehicle comprising:

a reservoir containing brake fluid a wheel cylinder operatively associated with a road wheel of the vehicle;

an auxiliary hydraulic pressure source for generating a power hydraulic pressure used to apply brake pressure to the wheel cylinder in response to a braking requirement, the auxiliary hydraulic pressure source including a hydraulic pump for increasing a pressure of the brake fluid supplied from the reservoir to generate the power hydraulic pressure;

power hydraulic pressure observing means for continuously observing the power hydraulic pressure generated by the auxiliary hydraulic pressure source and for generating a signal to control operation of the hydraulic pump based on the power hydraulic pressure;

pump operating condition judging means for judging whether or not an operating condition of the hydraulic pump satisfies a predetermined operating condition based on the power hydraulic pressure observed by the power hydraulic pressure observing means; and warning means for comparing the power hydraulic pressure observed by the power hydraulic observing means with a predetermined hydraulic pressure which is lower than a pressure value for starting driving of the hydraulic pump from a stopped condition and for generating a warning signal indicating a failure of the power hydraulic pressure when the power hydraulic pressure is less than the predetermined hydraulic pressure and the pump operating condition determining means determines that the operating condition of the hydraulic pump does not satisfy the predetermined operating condition.

2. The hydraulic brake apparatus according to claim 1, wherein the pump operating condition judging means detects a rising tendency of the power hydraulic pressure observed by the power hydraulic pressure observing means, and the pump operating condition judging means judges that the operating condition of the hydraulic pump satisfies the predetermined operating condition when the power hydraulic pressure observed by the power hydraulic pressure observing means shows a rising tendency while the power hydraulic pressure observed by the power hydraulic pressure observing means is less than the predetermined hydraulic pressure.

3. The hydraulic brake apparatus according to claim 2, wherein the pump operating condition judging means judges a rising tendency of the power hydraulic pressure observed by the power hydraulic pressure observing means and detects a starting of a driving of the hydraulic pump, and the pump operating condition judging means judges that the operating condition of the hydraulic pump satisfies the predetermined operating condition when the power hydraulic pressure observed by the power hydraulic pressure observing means shows the rising tendency from a zero pressure within a predetermined time period after the driving of the hydraulic pump is started.

4. The hydraulic brake apparatus according to claim 2, wherein the pump operating condition judging means judges a rising tendency of the power hydraulic pressure observed by the power hydraulic pressure observing means, and the pump operating condition judging means judges that the operating condition of the hydraulic pump satisfies the predetermined operating condition when the power hydraulic pressure observed by the power hydraulic pressure observing means shows the rising tendency within the predetermined time period after the power hydraulic pressure observed by the power hydraulic pressure observing means falls below the predetermined hydraulic pressure.

5. The hydraulic brake apparatus according to claim 4, wherein the pump operating condition judging means calculates a changing rate of the power hydraulic pressure observed by the power hydraulic pressure observing means, and the pump operating condition judging means judges that the operating condition of the hydraulic pump satisfies the predetermined operating condition when the changing rate of the power hydraulic pressure observed by the power hydraulic pressure observing means changes from a negative rate to a positive rate within a predetermined time period after the power hydraulic pressure observed by the power hydraulic pressure observing means falls below the predetermined hydraulic pressure.

6. The hydraulic brake apparatus according to claim 1, wherein the pump operating condition judging means calculates a changing rate of the power hydraulic pressure observed by the power hydraulic pressure observing means and detects a starting of driving of the hydraulic pump, and the pump operating condition judging means judges that the operating condition of the hydraulic pump satisfies the predetermined operating condition when the changing rate of the power hydraulic pressure observed by the power hydraulic pressure observing means becomes positive within a predetermined time period after the driving of the hydraulic pump is started.

7. A hydraulic brake apparatus for a vehicle comprising:
a reservoir containing brake fluid;
a wheel cylinder operatively associated with a road wheel of the vehicle;
an auxiliary hydraulic pressure source for generating a power hydraulic pressure used to apply brake pressure to the wheel cylinder in response to a braking requirement, the auxiliary hydraulic pressure source including a hydraulic pump for increasing a pressure of the brake fluid supplied from the reservoir to generate the power hydraulic pressure;
power hydraulic pressure observing means for continuously observing the power hydraulic pressure generated by the auxiliary hydraulic pressure source and for generating a signal to control operation of the hydraulic pump based on the power hydraulic pressure;
pump operating condition judging means for judging whether or not an operating condition of the hydraulic pump satisfies a predetermined operating condition based on the power hydraulic pressure observed by the power hydraulic pressure observing means; and
warning means for comparing the power hydraulic pressure observed by the power hydraulic observing means with a predetermined hydraulic pressure and for generating a warning signal indicating a failure of the power hydraulic pressure when the power hydraulic pressure is less than the predetermined hydraulic pressure and the pump operating condition determining means determines that the operating condition of the hydraulic pump does not satisfy the predetermined operating condition:
a hydraulic pressure generating apparatus for generating brake pressure in response to operation of a brake operating member, the hydraulic pressure generating apparatus including a master cylinder and a hydraulic brake booster operable by the power hydraulic pressure to assist operation of the master cylinder;
a master cylinder hydraulic pressure sensor for continuously detecting a master cylinder hydraulic pressure generated by the master cylinder;
a consumed hydraulic pressure estimating means for estimating consumed hydraulic pressure at the auxiliary hydraulic pressure source based on the master cylinder pressure detected by the master cylinder hydraulic pressure sensor; and
the pump operating condition judging means calculating a changing rate of the power hydraulic pressure observed by the power hydraulic pressure observing means and calculating a changing rate of the consumed hydraulic pressure estimated by the consumed hydraulic pressure estimating means, the pump operating condition judging means judging that the operating condition of the hydraulic pump satisfies the predetermined operating condition when a sum of the changing rate of the consumed hydraulic pressure estimated by the consumed hydraulic pressure estimating means and a predetermined lowest changing rate of the outputting hydraulic pressure of the hydraulic pump is less than the changing rate of the power hydraulic pressure observed by the power hydraulic pressure observing means.

8. A hydraulic brake apparatus for a vehicle comprising:
a reservoir containing brake fluid
a wheel cylinder operatively associated with a road wheel of the vehicle;
an auxiliary hydraulic pressure source for generating a power hydraulic pressure used to apply brake pressure to the wheel cylinder in response to a braking requirement, the auxiliary hydraulic pressure source including a hydraulic pump for increasing a pressure of the brake fluid supplied from the reservoir to generate the power hydraulic pressure;

power hydraulic pressure observing means for continuously observing the power hydraulic pressure generated by the auxiliary hydraulic pressure source and for generating a signal to control operation of the hydraulic pump based on the power hydraulic pressure;

pump operating condition judging means for judging whether or not an operating condition of the hydraulic pump satisfies a predetermined operating condition based on the power hydraulic pressure observed by the power hydraulic pressure observing means;

warning means for comparing the power hydraulic pressure observed by the power hydraulic observing means with a predetermined hydraulic pressure and for generating a warning signal indicating a failure of the power hydraulic pressure when the power hydraulic pressure is less than the predetermined hydraulic pressure and the pump operating condition determining means determines that the operating condition of the hydraulic pump does not satisfy the predetermined operating condition;

a wheel cylinder hydraulic pressure sensor for continuously detecting the hydraulic brake pressure supplied to the wheel cylinder;

a consumed hydraulic pressure estimating means for estimating consumed hydraulic pressure at the auxiliary hydraulic pressure source based on the wheel cylinder hydraulic pressure detected by the wheel cylinder hydraulic pressure sensor; and the pump operating condition judging means calculating a changing rate of the power hydraulic pressure observed by the power hydraulic pressure observing means and calculating a changing rate of the consumed hydraulic pressure estimated by the consumed hydraulic pressure estimating means, the pump operating condition judging means judging that the operating condition of the hydraulic pump satisfies the predetermined operating condition when a sum of the changing rate of the consumed hydraulic pressure estimated by the consumed hydraulic pressure estimating means and a predetermined lowest changing rate of the outputting hydraulic pressure of the hydraulic pump is less than the changing rate of the power hydraulic pressure observed by the power hydraulic pressure observing means.

9. A hydraulic brake apparatus for a vehicle comprising:

a reservoir containing brake fluid;

a wheel cylinder associated with a road wheel of the vehicle;

an auxiliary hydraulic pressure source for generating a power hydraulic pressure used to apply a brake pressure to the wheel cylinder in response to a braking requirement, the auxiliary hydraulic pressure source including a hydraulic pump for increasing a pressure of the brake fluid supplied from the reservoir to generate the power hydraulic pressure;

power hydraulic pressure monitoring means for continuously detecting the power hydraulic pressure generated by the auxiliary hydraulic pressure source and for generating a signal to control operation of the hydraulic pump based on the detected power hydraulic pressure;

means for detecting a changing rate of the power hydraulic pressure detected by the power hydraulic pressure monitoring means and for generating a warning signal indicating a failure of the power hydraulic pressure on the basis of a comparison result of the detected power hydraulic pressure and a predetermined pressure which is lower than a pressure value for starting driving of the hydraulic pump from a stopped condition and the changing rate of the detected power hydraulic pressure.

10. The hydraulic brake apparatus according to claim 9, wherein said means for detecting a changing rate of the power hydraulic pressure judges that an operating condition of the hydraulic pump satisfies a predetermined operating condition when a positive changing rate of the power hydraulic pressure is detected within a predetermined time while the power hydraulic pressure detected by the power hydraulic pressure monitoring means is less than a predetermined hydraulic pressure.

11. The hydraulic brake apparatus according to claim 9, wherein the means for detecting a changing rate of the power hydraulic pressure judges that an operating condition of the hydraulic pump satisfies a predetermined operating condition when a positive changing rate of the power hydraulic pressure from a zero pressure is detected by the means for detecting a changing rate of the power hydraulic pressure detects within a predetermined time period after driving of the hydraulic pump is started.

12. The hydraulic brake apparatus according to claim 9, wherein the means for detecting a changing rate of the power hydraulic pressure judges that an operating condition of the hydraulic pump satisfies a predetermined operating condition when a positive changing rate of the power hydraulic pressure is detected by the means for detecting a changing rate of the power hydraulic pressure within a predetermined time period after the power hydraulic pressure detected by the power hydraulic pressure monitoring means falls below a predetermined hydraulic pressure.

13. A hydraulic brake apparatus for a vehicle comprising:

a reservoir containing brake fluid;

a wheel cylinder associated with a road wheel of the vehicle;

an auxiliary hydraulic pressure source for generating a power hydraulic pressure used to apply a brake pressure to the wheel cylinder in response to a braking requirement, the auxiliary hydraulic pressure source including a hydraulic pump for increasing a pressure of the brake fluid supplied from the reservoir to generate the power hydraulic pressure;

power hydraulic pressure monitoring means for continuously detecting the power hydraulic pressure generated by the auxiliary hydraulic pressure source and for generating a signal to control operation of the hydraulic pump based on the detected power hydraulic pressure;

means for detecting a changing rate of the power hydraulic pressure detected by the power hydraulic pressure monitoring means and for generating a warning signal indicating a failure of the power hydraulic pressure on the basis of the detected power hydraulic pressure and the changing rate of the detected power hydraulic pressure;

a hydraulic pressure generating apparatus for generating brake pressure in response to operation of a brake operating member, the hydraulic pressure generating apparatus including a master cylinder and a hydraulic brake booster operable by the power hydraulic pressure to assist operation of the master cylinder;

a master cylinder hydraulic pressure sensor for continuously detecting a master cylinder hydraulic pressure generated by the master cylinder;

a consumed hydraulic pressure estimating means for estimating consumed hydraulic pressure at the auxiliary hydraulic pressure source based on the master cylinder pressure detected by the master cylinder hydraulic pressure sensor; and the means for detecting a changing rate of the power hydraulic pressure calculating a changing rate of the consumed hydraulic pressure estimated by the consumed hydraulic pressure estimating means and judging that an operating condition of the hydraulic pump satisfies a predetermined operating condition when a sum of the changing rate of the consumed hydraulic pressure estimated by the consumed hydraulic pressure estimating means and a predetermined lowest changing rate of the outputting hydraulic pressure of the hydraulic pump is less than the changing rate of the power hydraulic pressure detected by the means for detecting a changing rate of the power hydraulic pressure.

14. A hydraulic brake apparatus for a vehicle comprising:

a reservoir containing brake fluid;

a wheel cylinder associated with a road wheel of the vehicle;

an auxiliary hydraulic pressure source for generating a power hydraulic pressure used to apply a brake pressure to the wheel cylinder in response to a braking requirement, auxiliary hydraulic pressure source including a hydraulic pump for increasing a pressure of the brake fluid supplied from the reservoir to generate the power hydraulic pressure;

power hydraulic pressure monitoring means for continuously detecting the power hydraulic pressure generated by the auxiliary hydraulic pressure source and for generating a signal to control operation of the hydraulic pump based on the detected power hydraulic pressure;

means for detecting a changing rate of the power hydraulic pressure detected by the power hydraulic pressure monitoring means and for generating a warning signal indicating a failure of the power hydraulic pressure on the basis of the detected power hydraulic pressure and the changing rate of the detected power hydraulic pressure;

a wheel cylinder hydraulic pressure sensor for continuously detecting the hydraulic brake pressure supplied to the wheel cylinder;

a consumed hydraulic pressure estimating means for estimating consumed hydraulic pressure at the auxiliary hydraulic pressure source based on the wheel cylinder hydraulic pressure detected by the wheel cylinder hydraulic pressure sensor; and the means for detecting a changing rate of the power hydraulic pressure calculating a changing rate of the consumed hydraulic pressure estimated by the consumed hydraulic pressure estimating means and judging that an operating condition of the hydraulic pump satisfies the predetermined operating condition when a sum of the changing rate of the consumed hydraulic pressure estimated by the consumed hydraulic pressure estimating means and a predetermined lowest changing rate of the outputting hydraulic pressure of the hydraulic pump is less than the changing rate of the power hydraulic pressure detected by the means for detecting a changing rate of the power hydraulic pressure.

15. A method of operating a vehicle hydraulic brake apparatus comprising:

continuously determining a power hydraulic pressure generated by an auxiliary hydraulic pressure source, the auxiliary hydraulic pressure source including a hydraulic pump which increases a pressure of brake fluid supplied from a reservoir to generate the power hydraulic pressure that is used to apply brake pressure to a vehicle wheel cylinder;

generating a signal to control operation of the hydraulic pump based on the power hydraulic pressure;

comparing the power hydraulic pressure generated by the auxiliary hydraulic pressure source with a predetermined hydraulic pressure of the auxiliary hydraulic pressure source which is lower than a pressure value for starting driving of the hydraulic pump from a stopped condition;

determining whether or not an operating condition of the hydraulic pump satisfies a predetermined operating condition based on the detected power hydraulic pressure; and issuing a warning indicating failure of the power hydraulic pressure when the detected power hydraulic pressure is less than the predetermined hydraulic pressure and when it is determined that the operating condition of the hydraulic pump does not satisfy the predetermined operating condition.

16. The method according to claim 15, including determining a changing rate of the detected power hydraulic pressure, and judging that the operating condition of the hydraulic pump satisfies the predetermined operating condition when the changing rate of the detected power hydraulic pressure is positive.

17. The method according to claim 15, including determining a changing rate of the detected power hydraulic pressure and detecting starting of driving of the hydraulic pump, and judging that the operating condition of the hydraulic pump satisfies the predetermined operating condition when the changing rate of the detected power hydraulic pressure is positive within a predetermined time period after the driving of the hydraulic pump is started.

18. The method according to claim 15, including determining a changing rate of the detected power hydraulic pressure, and judging that the operating condition of the hydraulic pump satisfies the predetermined operating condition when the changing rate of the detected power hydraulic pressure is positive within a predetermined time period after the power hydraulic pressure falls below the predetermined hydraulic pressure.

\* \* \* \* \*